United States Patent [19]

Schultz

[11] 4,392,670
[45] Jul. 12, 1983

[54] PIVOTED STEERING COLUMN FOR LIFT TRUCK

[75] Inventor: Donald L. Schultz, Georgetown, Ky.

[73] Assignee: Clark Equipment Company, Buchanan, Mich.

[21] Appl. No.: 238,889

[22] Filed: Feb. 27, 1981

[51] Int. Cl.³ .............................................. B62D 1/18
[52] U.S. Cl. ...................... 280/775; 180/78
[58] Field of Search ................ 180/78, 132, 146, 334; 280/775; 74/493; 248/354 S

[56] References Cited

U.S. PATENT DOCUMENTS

| | | | |
|---|---|---|---|
| 2,152,895 | 4/1939 | Longtin | 248/354 S |
| 2,865,222 | 12/1958 | Backman | 180/78 |
| 3,022,974 | 2/1962 | Knodel | 248/354 S |
| 3,302,478 | 2/1967 | Pauwels | 180/78 |
| 3,799,569 | 3/1974 | Baker | 280/775 |
| 3,807,252 | 4/1974 | Parr | 280/775 |
| 3,941,492 | 3/1976 | Meinunger | 248/354 S |

Primary Examiner—Joseph F. Peters, Jr.
Assistant Examiner—Ross Weaver
Attorney, Agent, or Firm—John C. Wiessler

[57] ABSTRACT

A lift truck in which a steering column or pylon houses a steering post connected to a hydraulic steering component. A locking device which is manually operable by the operator is adapted to lock the steering column in an operative driving position, the steering column being adapted to be actuated forwardly in a pivotal motion to a non-operative position by a gas pressure spring when the locking device is released by the operator, thus moving it to a forward position wherein it provides an improved access path to the operator's compartment and wherein it does not obstruct the vertical path of movement of a drive component when the latter is deposited in or removed from its generally central mounting position in the lift truck.

2 Claims, 5 Drawing Figures

PIVOTED STEERING COLUMN FOR LIFT TRUCK

BACKGROUND OF THE INVENTION

1. Field of the Invention

The field of art to which the invention pertains includes steering gear for lift trucks, and the like, and particularly pivoted steering column assemblies.

2. Description of the Prior Art

Pivoted steering posts and columns are well-known particularly in the automotive field. In the field of material handling equipment, such as lift trucks, pivoted steering columns have not been generally used heretofore, although in certain lift truck designs being able to pivot the steering column forwardly of its operative position has distinct advantages in improving both driver comfort and ease of access and egress to and from the operator's compartment, as well as providing for easy access to the main batteries in electric powered trucks for deposit in and removal from the truck when the steering column is pivoted forwardly to a non-interfering position.

A relevant prior art patent in the field of construction vehicles is U.S. Pat. No. 3,737,003 which discloses a type of pivoted steering wheel for an earth moving vehicle such as a motor grader selectively tiltable for optimum positioning for different operators and to enable an operator to either sit or stand at his convenience. The steering wheel is maintained at a substantially constant inclination which maintains other controls at preferred positions relative to the steering wheel. The steering wheel may be locked in position at any selected inclination.

SUMMARY

The present invention comprises a steering column assembly particularly for lift trucks in which an upper steering assembly is pivoted from a lower assembly for pivotal movement between an operating position and a forward pivoted position. The upper assembly includes a hydraulic steering component assembly pivotable therewith. A locking cylinder and a pressurized actuator cylinder are pivotably connected between the lower and upper assemblies and operate both to lock the upper assembly in an operative position and, when the locking cylinder is released by an operator's control, to actuate the upper steering assembly to a forward pivoted position.

DESCRIPTION OF THE PREFERRED EMBODIMENT

Figure 1:
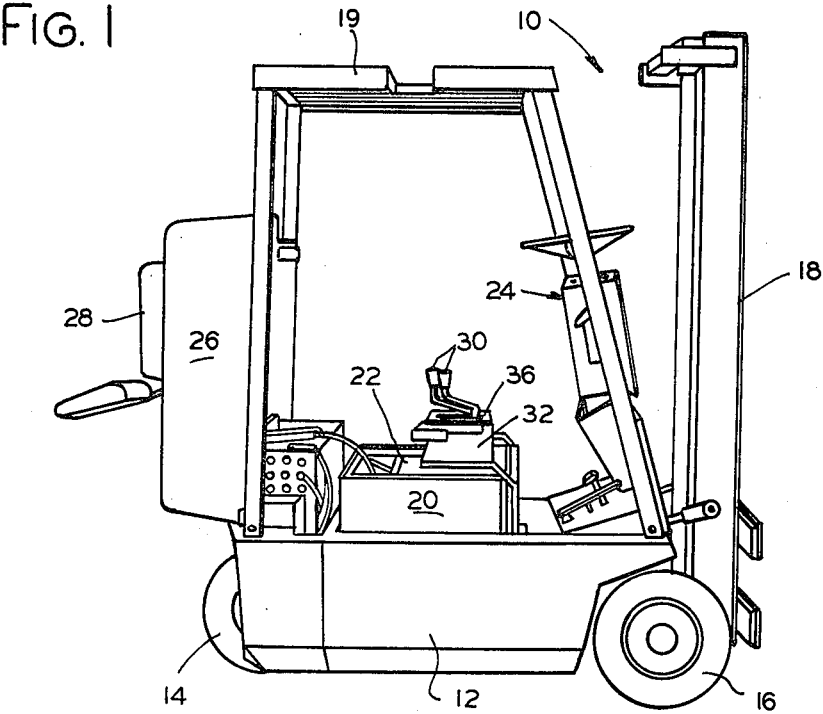
FIG. 1 is a perspective view of a lift truck showing certain components thereof in positions to expose a battery compartment and permit open access thereto in a vertical direction.
Figure 2:
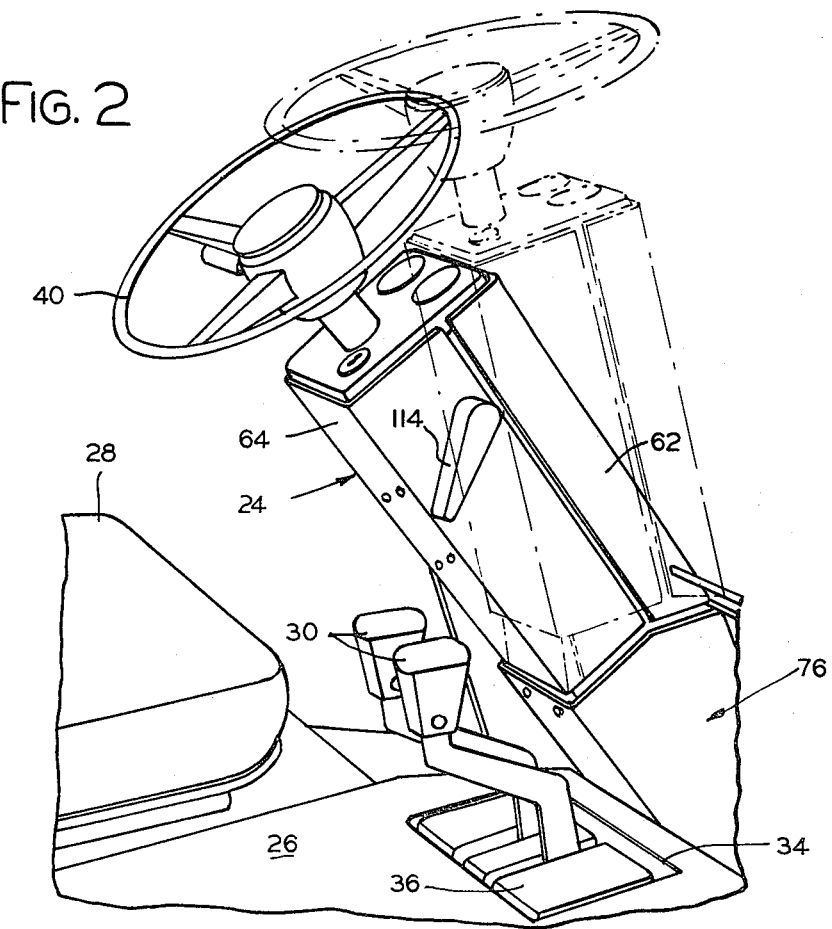
FIG. 2 is a perspective view of a portion of the operator's compartment showing the steering column of my invention in two positions of tilt.

Referring to FIGS. 1 and 2, a conventional lift truck is shown at 10 having a frame and body construction 12, a single center mounted steer wheel 14 at the rear of the truck, a pair of traction wheels 16 at the forward end, an upright assembly 18, an overhead guard assembly 19, a battery and drive component compartment 20 mounted centrally of the truck including a battery 22, an operator's steering wheel and column 24, a box-like hood device 26 having mounted thereon an operator's seat 28, and operator hydraulic valve control levers 30 mounted on a valve block 32 which is pivotable forwardly as an assembly from its operative position.

An opening 34 is formed in the right forward upper panel portion of hood 26 and is adapted to register with a slotted plate 36 when the control levers are in operative position and the hood is down, as shown in FIG. 2. The combination of the pivoted hood and control lever and valve bank assembly is disclosed and claimed in co-pending application Ser. No. 136,013 filed Mar. 31, 1980, in the name of Rittmann, common assignee.

Referring to FIGS. 2–5, an operator's steering wheel 40 is located on the end of a steering post 42 which is connected at its opposite end to a power steering control unit 44. Control unit 44 is adapted to be connected by a pair of hoses to a double-acting power cylinder of steer wheel 14 and to be connected to a pair of pressure ports 46,48 (FIG. 5), while a second pair of hoses connect to an inlet port 50 and to an outlet port 52, both being connected to a reservoir. The above control unit connections are conventional and the hoses, power cylinder and reservoir are not shown. A pump in the control unit operates continuously to circulate fluid to the reservoir except when a steering demand is made in one direction or the other, which effects a transferral of pump output under pressure to one or the other ends of the steer cylinder at wheel 14 by means of a gear drive motor, not shown, which is connected directly to steer post 42. A suitable power steering unit 44 is manufactured by the Fluid Power Division of Eaton Corporation of Eden Prairie, Minn., Model U-Series. The control unit is mounted by studs 54 to a U-shaped bracket 56 which is secured by connectors 58 to an upper housing 60 of the steering column.

The upper housing comprises a pair of facing U-shaped elongated plate member 62 and 64 which enclose the upper portion of the steering post assembly, as shown, plate 64 being secured by the connectors 58 to bracket 56 and plate 62 being a sheet metal press-in cover held at the sides between a pair of clamp members 66 mounted from the housing of control unit 44 and held in place at the top by a screw 68 which connects element 62 to instrument panel 70 which is in turn supported on bracket 56. The upper steering assembly and housing, hereinafter sometimes referred to as the upper pylon, is pivotally supported from fixed pivot shaft 72 mounted in a shaft support bracket 74 which is secured by bolts 75 to a fixed lower steering housing 76 by a forwardly extending bracket 78 mounted from shaft 72 and secured, as by welding, to the lower edge of housing section 64 at margin 80.

The lower housing 76 comprises a four sided sheet metal box-like construction 82 having an upwardly biased forward corner plate 84; it is secured, as by welding, to a truck frame or body portion 86.

Figure 3:
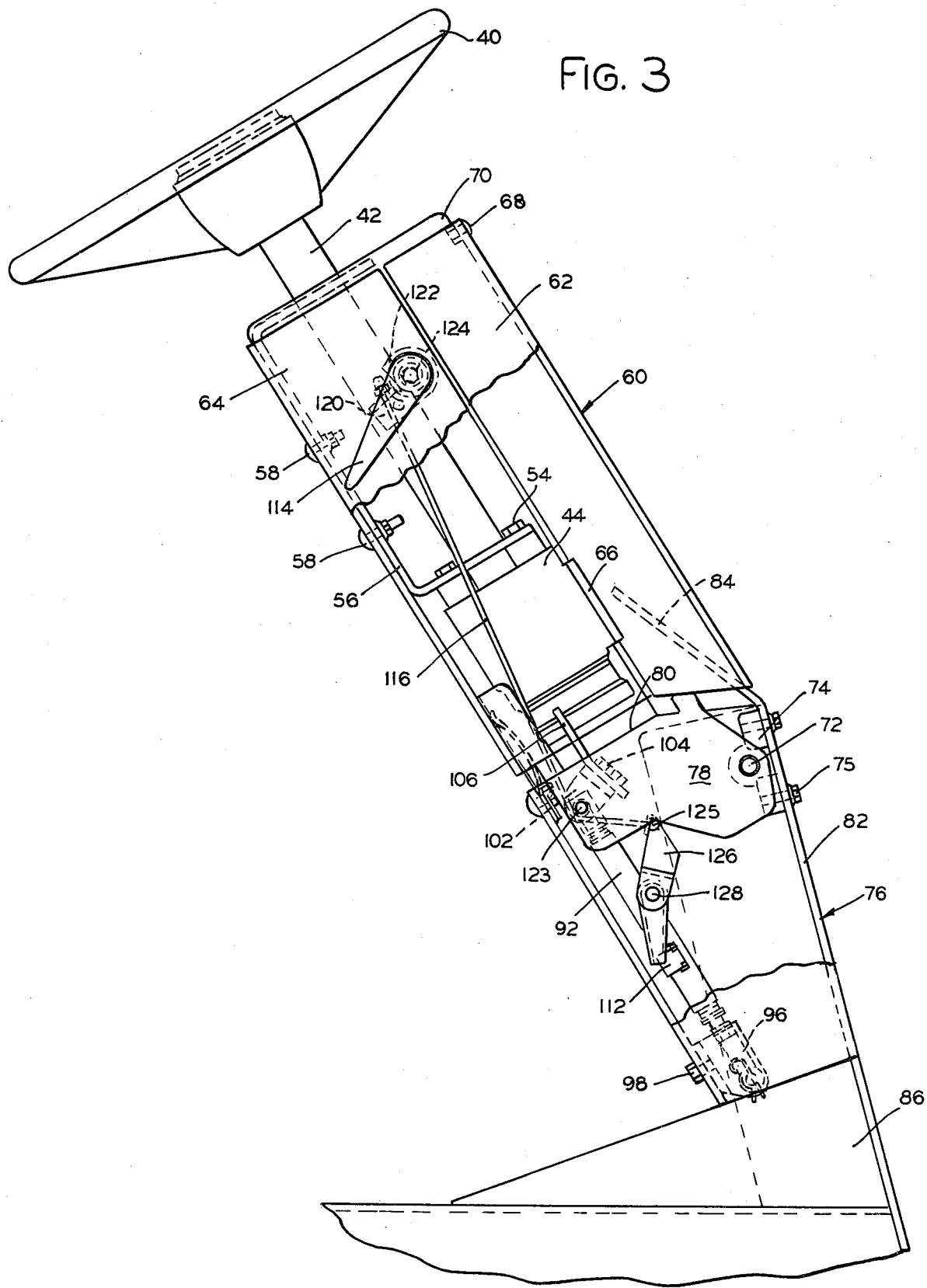
FIG. 3 is a side elevational view, partially broken away, of the steering column and associated structure shown in an operative position for steering the lift truck.
Figure 4:
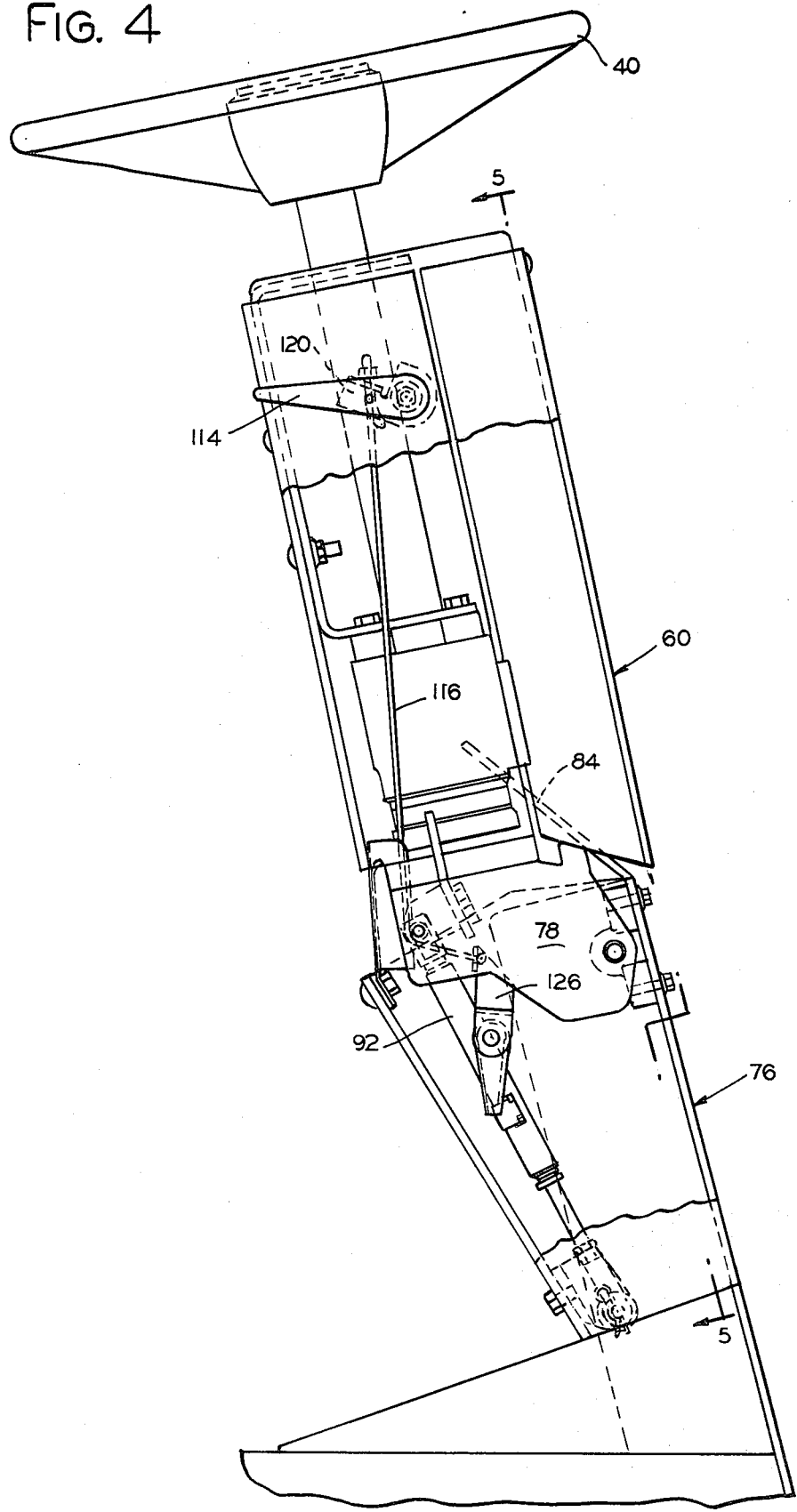
FIG. 4 is a view as in FIG. 3 with the steering column pivoted forwardly as in FIG. 1.
Figure 5:
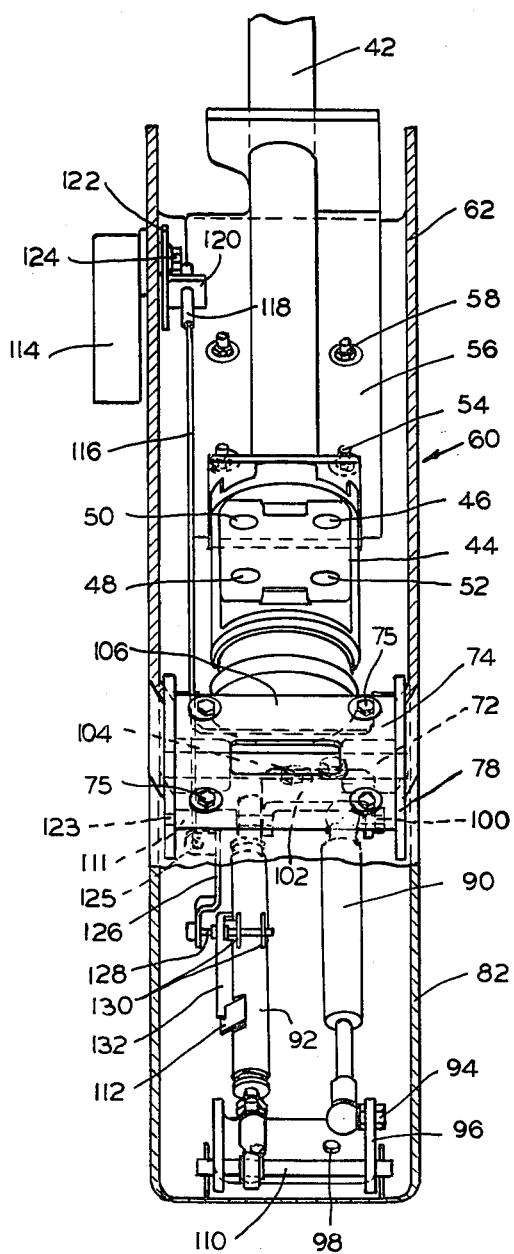
FIG. 5 is a front partial sectional view of the steering assembly taken along line 5—5 in FIG. 4.

A pair of cylinders 90 and 92 are mounted side-by-side in the lower housing and are connected to the upper pylon for actuating it to the tilt position shown in FIG. 4 and for locking it in the operative steering position shown in FIG. 3. Cylinder 90 is a closed pressurized gas cylinder connected between the upper pylon and the fixed lower housing or truck frame for continuously urging the upper pylon to its forward tilted position. As shown it is connected at its lower ball socket end by a pivot connection 94 to the one leg of a fixed U-shaped bracket 96 which is secured by a pair of connectors 98 to the rear wall of housing 76. Cylinder 90 is also pivotally secured at an upper end ball socket to a pivot connection 100 on the one leg of an upper U-shaped bracket 102 which is in turn secured to the upper pylon by connectors 104 securing the U-shaped bracket to an upwardly extending plate 106 which is secured at its side edges, as by welding, to the upper pylon housing and to bracket 78. Cylinder 92 is a mechanical locking cylinder pivoted from its lower end to a pin 110 which is mounted on the opposite leg of bracket 96; at its upper end it is supported from the opposite leg of U-bracket 102 by a pivot pin 111 which extends through both legs of U-bracket 102. Cylinder 92 is a spring-loaded mechanical lock having a tab 112 extending through the wall of the cylinder and connected to lock the cylinder in a retracted position and to permit the cylinder to extend during tilting movement of the upper steering pylon when actuated by gas cylinder 90. Locking cylinders of the type used are manufactured by P. L. Porter Company of Woodland Hills, Calif., a construction of which is disclosed in U.S. Pat. No. 3,874,480 which is assigned to that company.

A lever 114 is operatively connected to tab 112 for releasing the mechanical lock when it is desired to actuate the upper steering pylon to the FIG. 4 position. As noted previously gas cylinder 90 continuously urges the steering assembly to the FIG. 4 position but is normally restrained by the locking action of cylinder 92 which locks the steering assembly in the FIG. 3 position. Lever 114 is adapted to release the lock allowing cylinder 90 to effect the tilting action. It is connected to tab 112 by a cable 116 which is secured at its upper end by a member 118 to an angle bracket 120 having an upwardly extending part 122 which is secured to an inwardly extending stub shaft portion 124 extending through the one side of housing 64 and secured to lever 114. The cable extends downwardly around pin member 111 to which is also pivotally connected the upper end of cylinder 92. Pin 111 extends through both legs of U-bracket 102 and at its one end is supported from the one side of pivot bracket 78 at 123. The cable 116 terminates in a downwardly forwardly biased direction at connector 125 at the upper end of a lever 126 which is mounted at its opposite end to a transverse pin 128 supported in a pair of bracket members 130 which are secured to the surface of cylinder 92 such that a second lever 132, which is secured also to shaft 128, is adapted to contact cylinder tab 112. Internal spring action inside cylinder 92 normally actuates tab 112 forcibly outwardly of the cylinder to contact and actuate lever 126,132 clockwise which pulls cable 116 in a downward direction to maintain lever 114 in a normal position as in FIG. 3. Rotation of lever 114 in a clockwise direction effects an upward pull on cable 116 which rotates levers 126,132 in a counterclockwise direction on pin 128 thus moving element 132 in a direction to depress tab 112 against the internal spring action to effect an unlocking of cylinder 92 thus permitting gas cylinder 90 to actuate the upper pylon assembly in a clockwise direction to the FIG. 4 position.

To return the upper pylon from the FIG. 4 to the FIG. 3 position the operator pulls rearwardly on the steering wheel to oppose the force of the gas cylinder and to return the upper steering pylon to its locked operative position, the cylinder locking action being automatic causing lever 114 to be returned to its FIG. 3 position.

Although I have described and illustrated a preferred embodiment of my invention, it will be understood by those skilled in the art that modifications may be made in the structure, form, and relative arrangement of parts without necessarily departing from the spirit and scope of the invention. Accordingly, it should be understood that I intend to cover by the appended claims all such modifications which fall within the scope of my invention.

I claim:

1. A narrow profile adjustable steering column assembly for lift trucks and the like comprising,
   a lower fixed mounting assembly including an upwardly opening first housing,
   an upper steering column assembly pivoted about a transverse axis on said lower fixed mounting assembly and including a steering post and a power steering unit for energizing a remote power steer wheel to steer the lift truck,
   a pre-pressurized gas cylinder actuator located in said first housing and pivotally connected between said upper and lower assemblies continuously urging said upper assembly to a forward tilted non-operative position,
   a locking cylinder located in said first housing and pivotally connected between said upper and lower assemblies for holding said upper assembly in a locked operative position,
   a second housing surrounding said upper steering column assembly,
   said second housing being of approximately the same width as the said first housing and the two housings jointly providing a narrow profile minimizing the interference with the operator's view past the steering column assembly, and
   an operator control member mounted on said second housing and connected internally of both said housings for unlocking said locking cylinder to allow said cylinder actuator to tilt said upper assembly to said non-operative position.

2. An adjustable steering column assembly as claimed in claim 1 wherein said internal connection from said operator control member with said locking cylinder is of the cable and lever type.

* * * * *